Patented Apr. 19, 1938

2,114,665

UNITED STATES PATENT OFFICE 2,114,665

PROCESS FOR PRODUCING METALLIC LAYERS

Bernhard Loewe, Berlin, Germany

No Drawing. Application October 11, 1929, Serial No. 399,111. In Germany October 13, 1928

2 Claims. (Cl. 91—70.1)

The invention relates to a process of manufacturing metal layers especially of such metals which are only with difficulty or not at all to be volatilized or to be produced by the ordinary methods.

In the American Patent 1,373,038 there is already described a process of producing metals which are reducible only with difficulty. This method consists in forming a sublimable compound of the metal substance to be reduced and reducing such compound by another metallic substance capable of also forming a volatile compound during the reaction. This known method may yet only be used for producing metallic layers upon such metals which are also capable of forming a volatile compound during the reaction.

On the contrary it is an object of my invention to produce metallic layers especially of such metals which are to be volatilized only with difficulty upon such substances which are not capable of reducing the sublimable compound of the metallic substance to be deposited and/or not capable of forming also a volatile compound during the reaction.

Another object of my invention is to provide means to eliminate the residues which are formed upon the produced metallic layer if the reducing metal is not also capable of forming a sublimable compound.

A further object of my invention is a process of manufacturing condensers, the electrodes of which are produced immediately on their dielectric.

Other objects and advantages of my invention will be apparent from the following detailed description:

According to my invention the bodies which shall be coated with a layer of the not reducible and/or not volatilizable metal is firstly coated (in the vacuum) with an easily produced layer of easily volatilizable metals such as magnesium, aluminium, calcium and so on, which is capable of reducing the sublimable compound of the metal substance to be reduced, but is not capable of forming also a volatile compound during the reaction.

Such a layer for instance may be produced by vaporizing in the vacuum wherein the body to be coated is arranged, one or several of the said metals. After that a volatile compound of the metal with which the body is to be coated, for instance nickel chloride vapor, is introduced into the vacuum and the body heated therein.

Hereby the reducing metal layer, such as magnesium, deposited on the body in the first stage of the process reduces the introduced nickelchloride and a layer of metallic nickel is deposited on the body.

If only some parts of the body are to be coated with nickel, only those parts are previously coated with a layer of magnesium or the like.

In many cases the presence of magnesium chloride in the layer of nickel does not make any difference. If it is, however, necessary to eliminate the magnesium chloride that compound is distilled by further heating. The distillation is facilitated by blowing through hydrogen or the like.

In simpler cases when after the reaction described you need no longer work in the vacuum or under conditions shutting off moisture, the magnesium chloride may also be washed away by means of suitable solvents. The process described for magnesium and nickel chloride is not limited to these substances, but may with equal success be carried through with a large number of other substances. Thus aluminium, iron, cobalt and the like may be used in place of magnesium and volatile compounds of copper, tungsten, chromium, arsenic etc. instead of chloride of nickel, the fundamental condition being, however, that the metal first used is more electropositive than the other metal compounds subsequently used.

The process described may be employed in a large number of ways. You will, for instance, succeed by means of the process in producing stable equipotential cathodes in vacuum valves. You may further in this manner produce condensers whose limits of carrying capacity are very high owing to the high melting and boiling points of the metals finally used. You may further in this manner obtain insulating vessels which remain useful for very high temperatures. If the body of the vessel is made of mica or some other high melting material and if the vacuum areas are coated with metallic tungsten, vessels are obtained which may be used up to very high temperatures.

A further field for applying the process is the manufacture of electric resistances and the simple production upon metals of a coat, for instance, of chromium. It frequently happens that the chromium coating may be produced by a simple heating of the metals in an atmosphere of chromyl chloride. If necessary, the metals are first coated with magnesium or aluminium, the coating being subsequently under heating exposed to chromyl chloride vapours.

Whatsoever may be the embodiment of my invention, the fundamental principle of it is always a process for producing metallic precipitates in vacuum vessels which consists in producing a precipitate of a strongly electro-positive metal of high vapor pressure and in interacting such metal precipitate with the volatile compound of some other metal.

I claim:

1. A process for coating bodies which are not capable of reducing compounds of metals consisting in coating such bodies previously in a vacuum with a thin layer of magnesium by vaporizing said metal, introducing volatile chromylchloride and heating said magnesium coated body in the atmosphere of chromylchloride.

2. A process for coating bodies which are not capable of reducing compounds of metals consisting in coating such bodies previously in a vacuum with a thin layer of magnesium by vaporizing said metal, introducing a volatile chloride selected from the group consisting of nickel and chromium, and heating said magnesium coated body in the atmosphere of said chloride.

BERNHARD LOEWE.